United States Patent Office 3,483,738
Patented Dec. 16, 1969

3,483,738
PROCESS FOR STATICALLY BALANCING ROTARY DISCS
Walter Schweizer, Berlin, Germany, assignor to Kienzle Uhrenfabriken G.m.b.H., Schwenningen am Neckar, Germany, a company of Germany
Filed Mar. 20, 1967, Ser. No. 624,368
Claims priority, application Germany, Mar. 21, 1966, K 58,779
Int. Cl. G01m *1/00, 1/12*
U.S. Cl. 73—66         2 Claims

ABSTRACT OF THE DISCLOSURE

A process for producing statically balanced discs by the three-point method wherein the unbalanced disc is free to oscillate about its central axis, two deliberate unbalancing effects are made in the same radial plane inclined to the horizontal and a final effect to balance made on the vertical. Amount of the effects in terms of maximum natural unbalance, permissible final error, and inclination of the plane are set forth.

---

Figure 1:
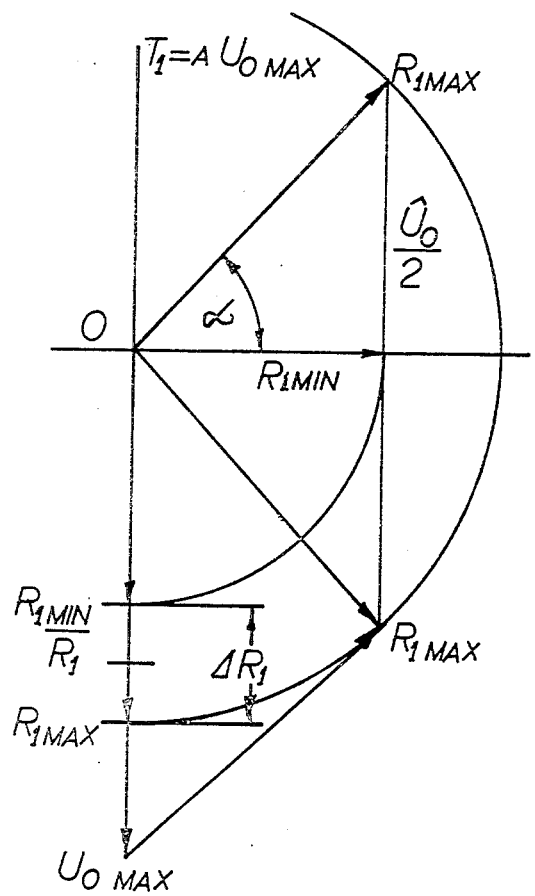

The following invention relates to a balancing out process for timepiece balance wheels and other disc shaped bodies. Owing to the inaccuracies in the relatively rough commercial production of such balance wheels the latter have an amount of unbalance or off-balance generally known as "natural" unbalance ranging from essentially zero to a maximum value for a particular set of easily controllable conditions of manufacture. The object of the invention is to eliminate or reduce these individual natural unbalances to a minimum value so small that their influence is not harmful.

Methods of statically balancing out each wheel have proved to be particularly good in practice though not quite comparable with the dynamic methods. In the static balancing out, first the frequency distribution of the amount of natural unbalance in a sufficiently sized population of balance wheels is determined. From an inspection of this frequency distribution there is apparent a maximum naturally occurring unbalance $U_{0\ max}$. This maximum occurring inherent unbalance is a unit of measure for the treating or deliberately imposed unbalancing means to be added to or removed from the disc shaped body, which treatment finally leads to a reduction of the unbalance of the disc body. In practice there has been a process employed with good results in which a defective balance wheel is allowed to oscillate in a vertical plane about its supposed center of gravity until coming to rest; thereupon a first treating unbalancing effect is made, such as by affixing a weight to the disc or removing metal of the disc diametrically opposite, in the disc at the angle $\alpha$ of 30° to the horizontal of the disc at rest, the amount added or bored out as the case may be being equal to the maximum occurring off-balance to be met with in commercial production. After again allowing swings or oscillation of the disc shaped body, a second treating unbalance is made on the body at about 21° to the vertical involving a moment again equal to the maximum amount of off balance. Thereupon still again the disc swings and a bore is made on the vertical but this time the amount of material removed is some 37% of the maximum unbalance.

Though the above described process produces a sufficiently good balancing out result, still this process can be accomplished commercially only with a relatively complicated balancing out machine. Machines utilizing this process are limited in use to work on like large-size timepiece balance wheels. The changeover of such balancing machines from use on one disc size to another requires a long period of changeover time and a very exacting justification of the replacement tooling.

It has been proposed to apply the first and second unbalancing effects at the same angle in space relative to the disc as described in General Motors Engineering Journal of January, February and March 1958. The balancing out by this process is extraordinarily poor and cannot be used on timepiece balance wheels. An advantage of this next above process can be seen in that a device for carrying out the process of balancing timepiece balance wheels can be designed quite simply so that it is useful for like balance wheels with good results. The hitherto known carousel with several stations can be limited to a single work position. The first and second application of unbalancing effects can be accomplished by the same work tooling.

An object of the present invention is to avoid the drawbacks mentioned above. This is to say, to produce a three point balancing out process wherein the first and second treating unbalancing effects are made at the same angle to the horizontal and the final corrective balancing is applied on the vertical and wherein the resulting balancing out is optional.

In the invention wherein the first treating unbalancing effect $$T_1 = aU_{0\ max}$$

and for the second, $$T_2 = bU_{0\ max}$$

the relationship $$\frac{b^2}{a^2} - 2b + 1/4 = 0$$

is essentially valid, where $a$ and $b$ are factors.

The resultant amount R after the second treatment to be made on the vertical for the final removal of the unbalance is essentially equal to $$U_{0\ max} \left\{ b - 1/4 + \left[ 16 b^2 \left( 32 - \frac{12}{b} + \frac{1}{b^2} \right) \right]^{-1} \right\}$$

In a different static balancing out process which employs a treating unbalancing effect at an angle $\alpha$ with the horizontal and a final unbalancing weight in the vertical it is known that the relationship $2T_1 \sin \alpha = U_{0\ max}$ is valid.

Figure 2:
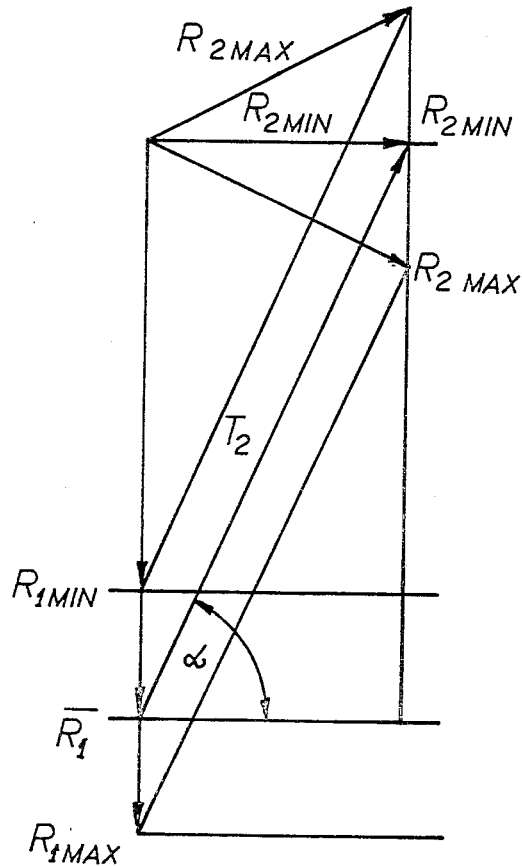
Figure 3:
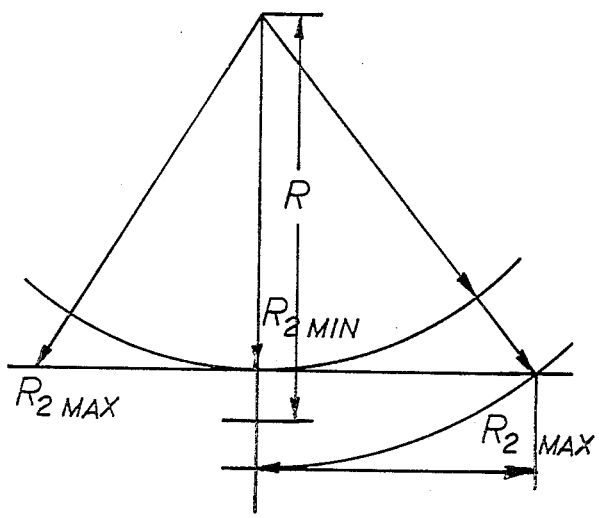

In the drawing:

FIG. 1 explains the relationship between the first treating unbalancing effect and the natural occurring off-balance to give a resultant off-balance;

FIG. 2 shows the interdependence between the second treating unbalancing effect and that owing to the resultant off-balance from the first treatment and the natural off-balance, and FIG. 3 shows the relationship between the final treating effect and the resultant effect after second treatment, for truing up the wheel.

For carrying out the invention any balance wheel with an unbalance of $U_0$ is allowed to swing about its intended center of gravity. Thereupon one applies at an angle $\alpha$ to the horizontal a first unbalancing effect $T_1$ equal to $a\ U_{0\ max}$. In this expression $2T_1 \sin \alpha = U_{0\ max}$ is always adhered to. Thus $T_1 \sin \alpha$ is represented by the half vertical $U_0/2$ above the horizontal in FIG. 1, the whole vertical being equal to $U_{0\ max}$.

Now with the first treatment being a vector off the vertical and of magnitude $a\ U_{0\ max}$ there will be a maximum resultant $R_{1\ max}$ and a minimum (for some particular disc) $R_{1\ min}$. When the disc is free to turn the resultant $R_1$, whether maximum, minimum or in between, acts in the vertical and has a magnitude less than $U_{0\ max}$ as shown in FIGS. 1 and 2.

Outer of values of the first treatment effect $T_1$ and value of the natural unbalance lies a resultant unbalance $R_1$ having a value between $R_{1\ max}$ and $R_{1\ min}$.

The resultant $R_1$ enables the oscillation of the disc again until a rest position is reached and then the second treatment $T_2$ is then applied at the same angle $\alpha$ in space to give a second resultant off-balance whose value lies between $R_{2\,max}$ and $R_{2\,min}$ as shown in FIG. 2 on a somewhat larger scale. But it is to be noted that even on the larger scale $T_2$ differs from $T_4$ in magnitude. Here, as in FIG. 1 th length of vectors radiating from their common origin represent the out-of-balance of the disc after theis respective treatments. This second resultant off-balance is allowed to swing the wheel freely until rest and then a final unbalance R is applied on the vertical, its value lying between $R_{2\,max}$ and $R_{2\,min}$. This is shown in FIG. 3 on a still larger scale.

It is so found that if the equation $2T_1 \cdot \sin \alpha = U_{0\,max}$ is adhered to the difference between $R_{2\,max}$ and $R_{2\,min}$ becomes a minimum if $$\frac{b^2}{a^2} - 2b + \tfrac{1}{4} = 0$$

therefore $$a = \frac{T_1}{U_{0\,max}} \text{ and } b = \frac{T_2}{U_{0\,max}}$$

The final moment R to be added lastly on the vertical to counterbalance the resultant $R_2$ should satisfy the equation $$R = U_{0\,max} \left\{ b - \tfrac{1}{4} + \left[ 16 b^2 \left( 32 - \frac{12}{b} + \frac{1}{b^2} \right) \right]^{-1} \right\}$$

In the practical carrying out of the process the distribution of the off-balance $U_0$ is determined. Then there is formulated just what maximum permissible final error in the disc shaped body should be allowed to remain after the balancing out. This maximum permissible final out of balance value X is expressed as a fraction of the maximum normally occurring amount of out-of-balance $U_{0\,max}$. It is in most cases less than 0.01. So then factor $b$ for the second treatment is determined from the equation $$b = \frac{3}{16} + \sqrt{\frac{1}{512 \cdot x}}.$$

Upon determination of this factor $b$, the factor $a$ is determined from the equation $$\frac{b^2}{a^2} - 2b + \tfrac{1}{4} = 0$$

and the value of the first treatment effect $T_1$ is obtained. From the formula $T_1 \sin \alpha = U_{0\,max}$ the size of angle $\alpha$, the inclination of the radial plane in which the first and second test effects are applied is determined.

Referring to the drawing, disturbance of rest of the disc by a change of weight in a peripheral portion by the addition or subtracting of material $T_1$ acting through an angle $\alpha$, when excess weight of off-balance is at the nadir, gives a resultant $R_1$ which lies between maximum and minimum amounts depending on the value of $U_0$.

With $R_1$ now turning to lie in the vertical, the disturbance due to $T_2$ acting through the same angle, gives a second result $R_2$ which again turns the disc until $R_2$ lies in the vertical. The final counterbalancing effect R is calculated as descred above based on the permissible error, and the inherent variations of it from $R_{2\,min}$ and $R_{2\,max}$ are not detrimental.

The invention claimed is:

1. In a process for balancing out a disc turnable about generally central horizontal axes having a natural unbalance of $U_0$ reaching a statistical maximum of $U_{0\,max}$, allowing one of the discs to turn freely about its axis until the out-of-balance is in the vertical, applying a first axial moment treatment $T_1$ to the disc at an angle $\alpha$ to the horizontal to alter the preceding unbalance, then allowing the disc to turn freely until the resultant unbalance lies in the vertical, then applying a second axial moment treatment $T_2$ differing from $T_1$ to the disc at the same angle to alter effect of the next preceding unbalance and produce a second resultant unbalance, again allowing the disc to rotate freely until the second resultant unbalance lies in the vertical, and then applying a third treatment $T_3$ in the vertical to alter the effect of the second resultant, the condition $2T_1 \sin a = U_{0\,max}$ being substantially met, and $$T_1 = a\, U_{0\,max}$$
$$T_2 = b\, U_{0\,max}$$

where $a$ and $b$ are different and are related by the equation $$\frac{b^2}{a^2} - 2b = \tfrac{1}{4} = 0$$

and the third treatment made in the vertical and having a value equal to $$U_{0\,max} \left\{ b - \tfrac{1}{4} + \left[ 16 b^2 \left( 32 - \frac{12}{b} + \frac{1}{b^2} \right) \right]^{-1} \right\}$$

2. In a process as claimed in claim 1 wherein when the final unbalance of the wheel is $x\, U_{0\,max}$ and $x < 0.01$, and $b$ is substantially $$\frac{3}{16} + \sqrt{\frac{1}{512x}}$$

References Cited

UNITED STATES PATENTS 2,195,252  3/1940  McKinley et al. _____ 73—480

FOREIGN PATENTS 873,386  7/1961  Great Britain.
1,019,875  2/1966  Great Britain.

JAMES J. GILL, Primary Examiner

U.S. Cl. X.R.

73—480